United States Patent [19]
Gnage et al.

[11] 3,767,513
[45] Oct. 23, 1973

[54] FILM STRIP TABBING APPARATUS
[75] Inventors: Oliver W. Gnage; Michael A. Petranto, both of Rochester, N.Y.
[73] Assignee: Eastman Kodak Company, Rochester, N.Y.
[22] Filed: Feb. 24, 1972
[21] Appl. No.: 229,068

[52] U.S. Cl.................. 156/516, 156/269, 156/307, 156/543, 156/544, 156/547, 156/554
[51] Int. Cl....................... B32b 31/04, B32b 31/20
[58] Field of Search................... 156/516, 522, 539, 156/543, 544, 547, 550, 554, 290, 269

[56] References Cited
UNITED STATES PATENTS
| | | | |
|---|---|---|---|
| 2,720,248 | 10/1955 | Kipnis................................ | 156/516 |
| 2,551,689 | 5/1951 | Miller................................ | 156/543 |
| 2,808,871 | 10/1957 | Brown................................ | 156/556 |
| 3,516,890 | 6/1970 | Gallistel et al...................... | 156/530 |

*Primary Examiner*—Daniel J. Fritsch
*Attorney*—W. H. J. Kline et al.

[57] ABSTRACT

A film strip tabbing apparatus is adapted for use with a photographic film strip having a longitudinally extending series of frame areas and for use with a film tabbing strip having a longitudinally extending series of information areas which can be respectively aligned with such film frame areas. The apparatus includes a film and tabbing strip metering assembly for moving respective film and tabbing strip sections which have the same number of frame and information areas into position for securement together and, once secured together, into position for severance from remaining lengths of the film and tabbing strips. Pin members of the apparatus cooperate with uniformly spaced perforations in the film and tabbing strips for positioning the frame and information areas on the film and tabbing strip sections in respective alignment, preparatory to securing the film and tabbing strip sections together.

6 Claims, 14 Drawing Figures

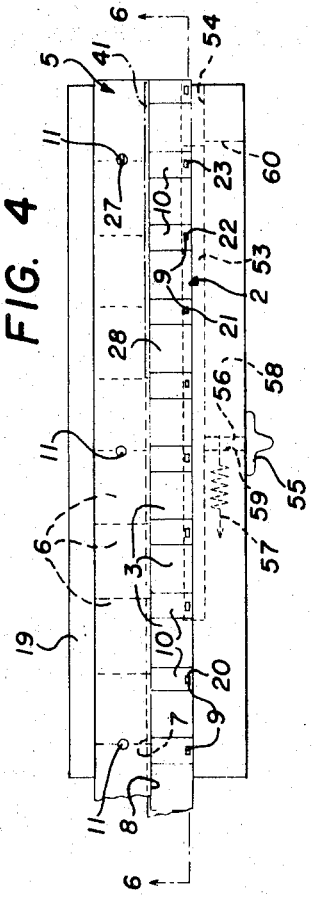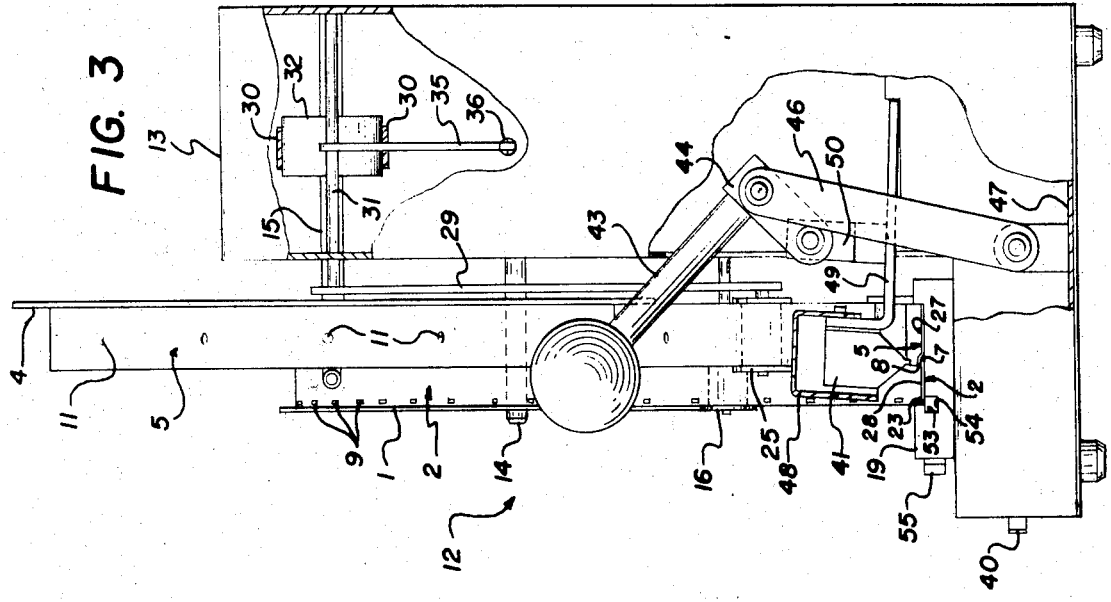

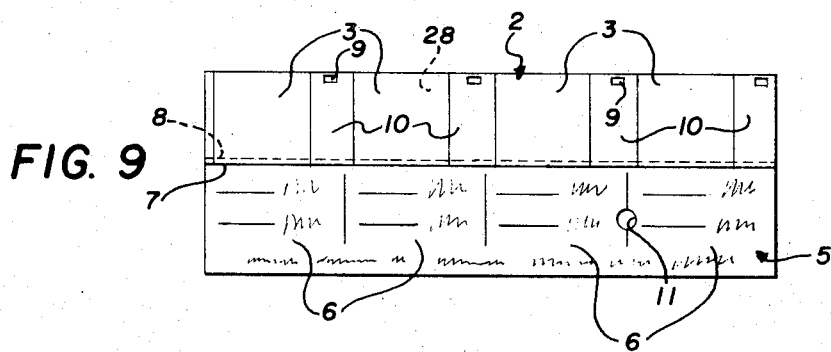
FIG. 9
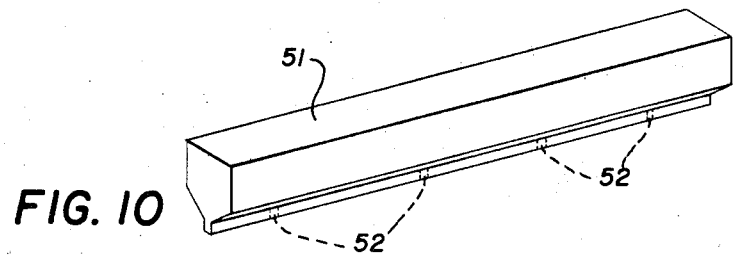
FIG. 10
FIG. 11
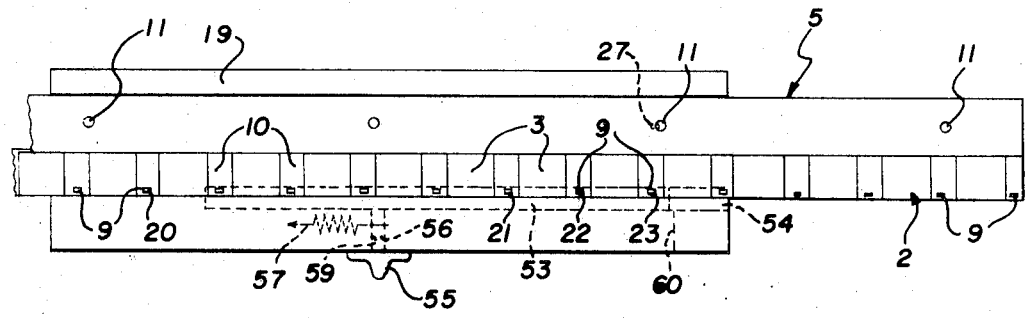

FILM STRIP TABBING APPARATUS

CROSS REFERENCE TO RELATED APPLICATIONS

Reference is made to commonly assigned copending U.S. Pat. application Ser. No. 24,742, now abandoned, entitled FILM IDENTIFICATION AND HANDLING TAB and filed in the names of Richard K. Sprenkle, Willis L. Stockdale and Leonard H. Wunrow on Apr. 1, 1970. Reference is further made to commonly assigned copending U.S. Pat. application Ser. No. 228,937 entitled APPARATUS AND METHOD FOR SECURING TOGETHER PHOTOGRAPHIC MATERIAL AND A TAB and filed in the names of David C. Epperson and Willis L. Stockdale on Feb. 24, 1972.

BACKGROUND OF THE INVENTION

1. Field of the Invention

The present invention relates to apparatus for securing together respective sections of a photographic film strip and a film tabbing strip and for then severing film and tabbing strip sections, so secured, from remaining lengths of the film and tabbing strips.

2. Description of the Prior Art

Photofinishers processing amateur color print film and making paper prints therefrom, commonly send processed film negatives to a customer in the form of short negative film strips which each contain several image-bearing frames. A print reorder usually accompanies the negative film strips. Should the customer desire additional prints of particular negative frames, the customer returns the print reorder along with such negative frames to the photofinisher. As disclosed in commonly assigned copending U.S. Pat. application Ser. No. 24,742 (more specifically referenced hereinbefore), the print reorder may take the form of a tabbing strip which is intended to be secured to the negative film strip by the photofinisher. In a preferred embodiment, the tabbing strip is substantially the same length as the negative film strip and has a plurality of print reorder information areas which correspond in number to the different image-bearing frames contained on the negative film strip. These print reorder information areas are individually provided with a plurality of information boxes which can be selectively checked by the customer to indicate to the photofinisher the number and size of prints desired for a particular negative frame. Upon securing the film and tabbing strips together, the negative frames and the print reorder information areas will be disposed in respective alignment so that the customer can easily identify a particular negative frame with one of the information areas. Moreover, since the tabbing strip in the preferred embodiment is secured along a longitudinal edge of the negative film strip, the tabbing strip serves as a convenient means for readily handling the negative film strip without touching the film surface.

To facilitate handling, during processing, of a plurality of color print film strips, the photofinisher can splice such film strips together in end-to-end relation so as to form a continuous film web. As will be realized from U.S. Pat. application Ser. No. 24,742 once the web of attached film strips has been processed, a film strip section having a predetermined number of image-bearing frames can be severed from the remaining film strip length. Then, a tabbing strip which has the same number of print reorder information areas as the image-bearing frames on the severed film strip section can be secured to such film strip section in a manner whereby the information areas and the frames will be disposed in respective alignment. However, such a procedure, if undertaken completely by hand, would be obviously time-consuming, inefficient and costly.

SUMMARY OF THE INVENTION

It is therefore an object of the present invention to provide apparatus for securing together respective sections of a photographic film strip and a film tabbing strip and for then severing film and tabbing strip sections, so secured, from remaining lengths of the film and tabbing strips.

A further object of the present invention is to provide a film tabbing apparatus which is adapted for use with a photographic film strip having a longitudinally extending series of frame areas and for use with a film tabbing strip having a longitudinally extending series of information areas which can be respectively aligned with such film frame areas.

Another object of the present invention is to provide a film tabbing apparatus for positioning the same number of frame and information areas on individual sections of such film and tabbing strips in respective alignment, securing the film and tabbing strip sections together, and then severing the film and tabbing strip sections from remaining lengths of the film and tabbing strips.

In accordance with a preferred embodiment of the present invention there is described in detail hereinafter, a film tabbing apparatus which is adapted for use with a photographic film strip having a longitudinally extending series of frame areas and for use with a tabbing strip having a longitudinally extending series of information areas which can be respectively aligned with such film frame areas. The apparatus includes a strip advancing or metering assembly for drawing respective sections of the film and tabbing strips which have the same number of frame and information areas off individual strip supply rolls and then moving such film and tabbing strip sections into position for securement together. Pin members of the apparatus cooperate with generally uniformly spaced perforations in the film and tabbing strips, to engage such film and tabbing strip sections and locate the frame and information areas thereon in respective alignment. Once secured together, such film and tabbing strip sections are disengaged from the pin members and moved by the strip advancing mechanism into position for severance from remaining lengths of the film and tabbing strips. At the same time, further respective sections of the film and tabbing strips which have the same number of frame and information areas as the first-mentioned strip sections are moved by the strip advancing mechanism into engagement with the pin members.

BRIEF DESCRIPTION OF THE DRAWINGS

The above-mentioned and other features and objects of the present invention and the manner of obtaining them will become more apparent by reference to the following detailed description of a preferred embodiment of such invention taken in conjunction with the accompanying drawings wherein:

FIG. 3 is a side elevation view of the film tabbing apparatus;

FIGS. 4 and 5 are top plan views of film and tabbing strip sections and a strip advancing and aligning mechanism of the film tabbing apparatus, respectively showing the film and tabbing strip sections in position for securement together and in position for severance from remaining lengths of the film and tabbing strips;

FIG. 9 is a top plan view of film and tabbing strip sections after severance from remaining lengths of the film and tabbing strips;

FIG. 10 is a perspective view of an alternate embodiment of a strip securing member of the film tabbing apparatus;

FIG. 11 is a view similar to FIG. 5, illustrating a feature of the strip advancing and aligning mechanism;

DESCRIPTION OF THE PREFERRED EMBODIMENT

Figure 1:
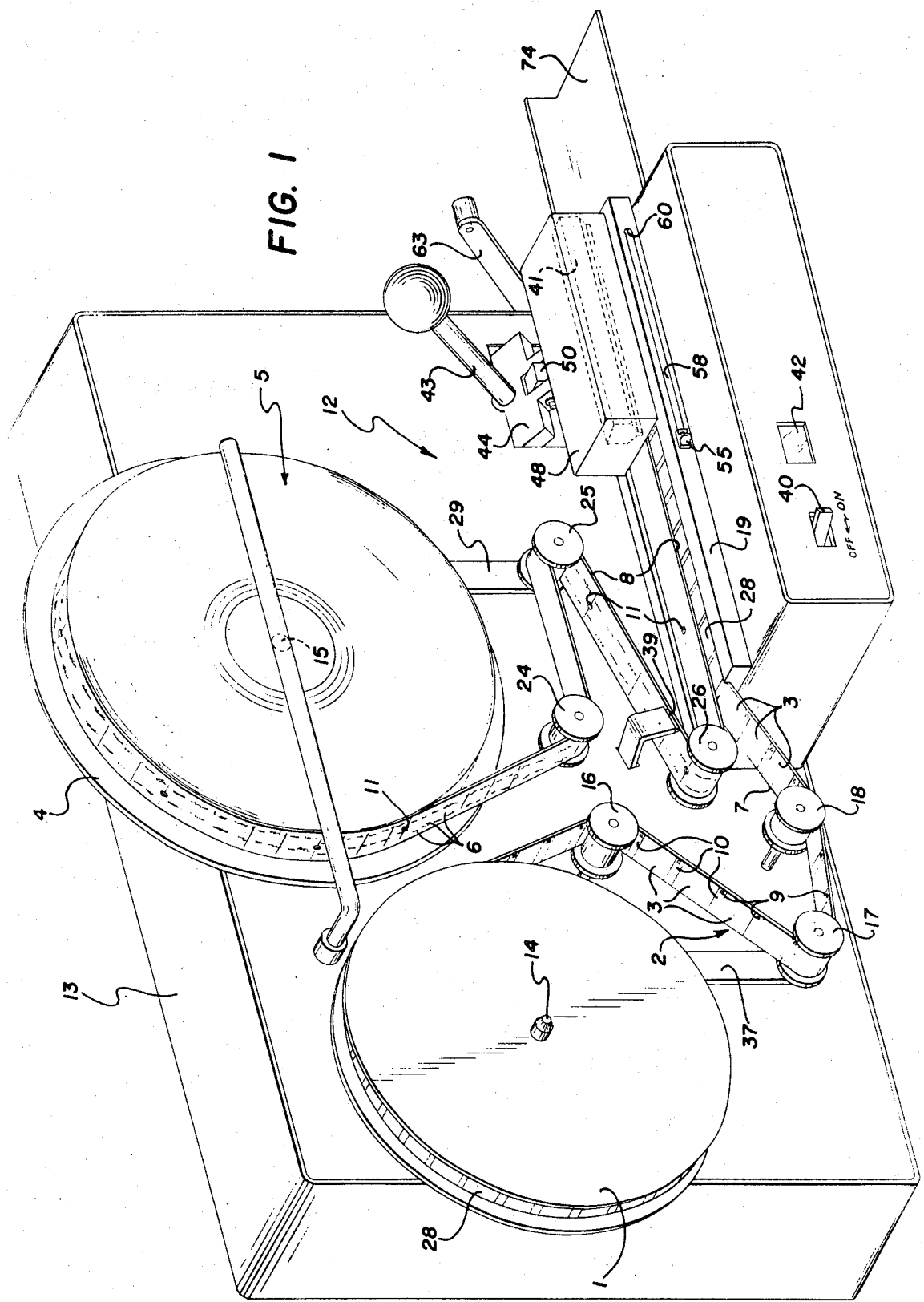
FIG. 1 is a perspective view of a film tabbing apparatus which, in accordance with a preferred embodiment of the present invention, is adapted to secure together respective sections of a photographic film strip and a film tabbing strip and then sever such secured strip sections from remaining lengths of the film strip and the tabbing strip.

Referring now to the drawings and in particular to FIG. 1, there is shown a strip supply reel 1 on which is supported a roll of negative film strip 2 containing a longitudinally extending series of image-bearing frames (several of which are indicated by the reference number 3). Another strip supply reel 4 supports a roll of film tabbing strip 5 which is constructed of liquid permeable material, preferably paper. As disclosed in commonly assigned copending U.S. Pat. application Ser. No. 24,742 (more specifically referenced hereinbefore), the tabbing strip 5 in a preferred embodiment includes a longitudinally extending series of print reorder information areas (several of which are indicated by the reference number 6). Each of the information areas 6 is intended to identify with an individual one of the negative frames 3. More specifically, the information areas 6 are each provided with several print reorder information boxes (not shown) which can be selectively checked by a customer to indicate to a photofinisher the number and size of prints desired for a particular negative frame. In practice, the customer receives from the photofinisher equal length sections of the film strip 2 and the tabbing strip 3 which have been secured together along respective longitudinal edge portions 7 and 8 as shown in FIG. 9. When thus secured, the film strip 2 and the tabbing strip 3 are disposed in substantially coplanar, parallel relation and the different negative frames 3 are respectively aligned with the different information areas 6.

According to a preferred embodiment of the present invention, as shown in FIGS. 1 and 4, the negative film strip 2 further includes a longitudinally extending series of uniformly spaced perforations (several of which are indicated by the reference number 9). The film perforations 9 are respectively disposed on the film strip 2 at a plurality of opaque film areas (several of which are indicated by the reference number 10). The opaque film areas 10, in turn, are located between the different negative frames 3. Also, the film tabbing strip 5 further includes a longitudinally extending series of uniformly spaced perforations (several of which are indicated by the reference number 11). The tab perforations 11 are disposed on the tabbing strip 5 so as to be respectively separated by different tabbing strip sections which are each made up of four of the print reorder information areas 6 (see FIG. 4). The purpose of the film perforations 9, the tab perforations 11 and the respective perforation spacing will become apparent hereinafter on considering the manner in which the negative frames 3 and the information areas 6 on individual sections of the film strip 2 and the tabbing strip 5 are aligned preparatory to securing such film and tabbing strip sections together.

Further according to a preferred embodiment of the present invention, there is illustrated in FIG. 1 a film tabbing apparatus 12 for securing together respective sections of the negative film strip 2 and the film tabbing strip 5 and for thereafter severing such secured strip sections from remaining lengths of the film strip and the tabbing strip. The present invention is best understood by considering the film tabbing apparatus 12 in light of the operational steps followed in operating the overall device. Thus, the different members of the film tabbing apparatus 12 will be described in the order in which they are encountered during a typical sequence of operation.

Referring again to FIG. 1, the film tabbing apparatus 12 includes a box-like base 13 on which is rotatably supported two reel spindles 14 and 15. After the reel 1 with a roll of the negative film strip 2 has been placed on a spindle 14, a leading section of the film strip is threaded successively over guide rollers 16, 17 and 18 and thence into a guide track 19. In the guide track 19, the film strip 2 is engaged by a film registration pin 20 and by three spaced film advance pins 21, 22 and 23 (see FIGS. 4 and 6). The pins 20–23 engage the film strip 2 upon extending into respective ones of the film perforations 9. Once a leading section of the film strip 2 is engaged by the pins 20–23, the reel 4 with a roll of the film tabbing strip 5 is placed on a spindle 15. Then, a leading section of the tabbing strip 5 is threaded successively over guide rollers 24, 25 and 26 and thence into the guide track 19. Whereupon, the tabbing strip 5 is engaged by a tab registration pin 27 which extends into one of the tab perforations 11 (see FIGS. 4 and 6). At this time, the image-bearing frames 3 on the engaged film strip section and the information areas 6 on the engaged tabbing strip section are disposed in respective alignment, and the separately engaged strip sections extend in parallel relation (see FIG. 4).

As shown in FIGS. 1, 3 and 4, the longitudinal edge portion 8 of the film tabbing strip 5 overlaps the longitudinal edge portion 7 of the negative film strip 2, along the respectively engaged strip sections in the guide track 19, so as to partially interface the tabbing strip section and an emulsion-bearing surface 28 of the film strip section. The significance of interfacing respective portions of the tabbing strip 5 and the emulsion-bearing film surface 28 will become apparent hereinafter on considering the manner in which the tabbing strip and the film strip are secured together.

Figure 2:
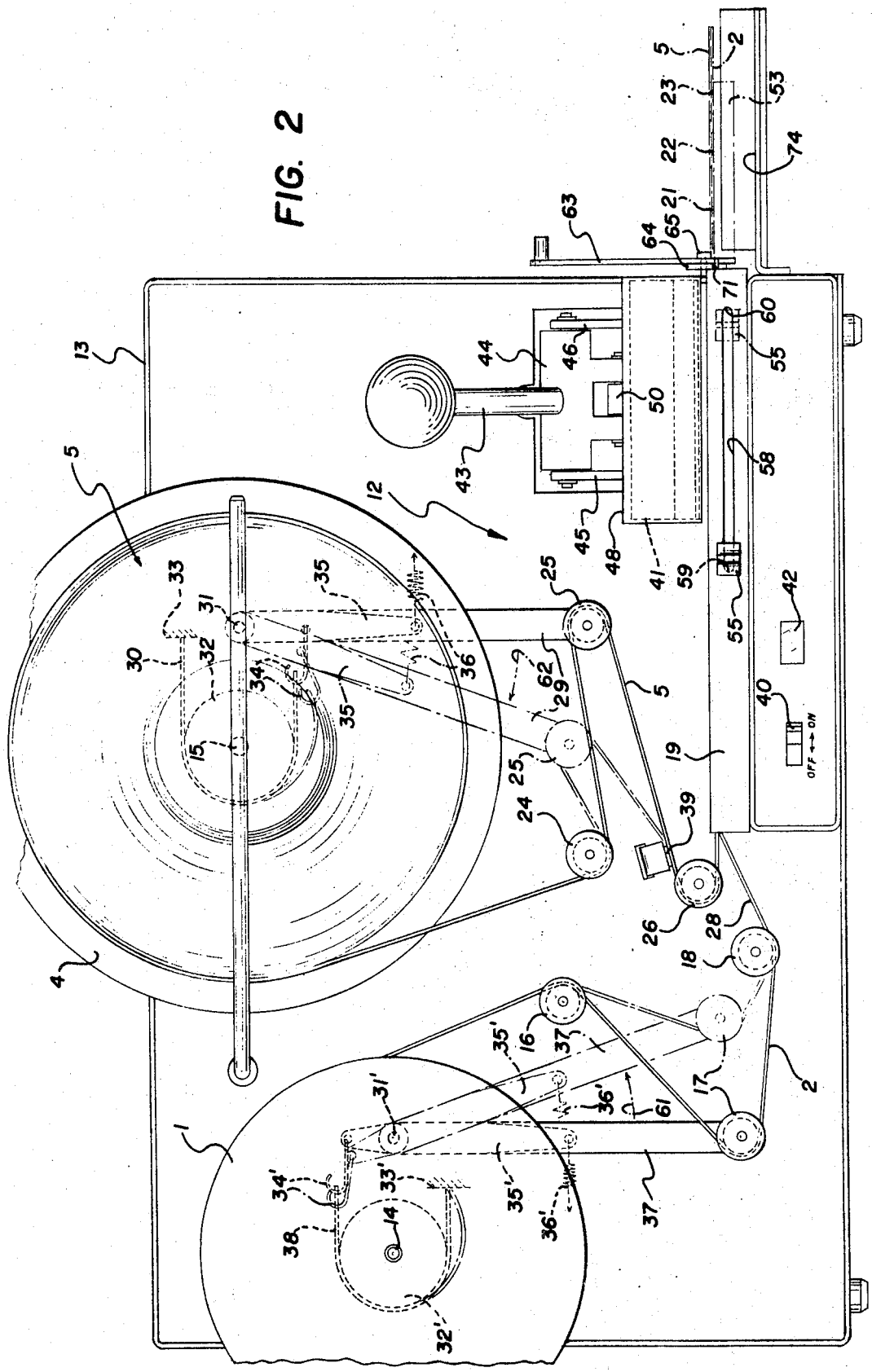
FIG. 2 is a front elevation view of the film tabbing apparatus, showing the manner in which further sections of the film and tabbing strips are withdrawn from respective strip supply rolls.

As can be seen in FIGS. 2 and 3, tension between the engaged section of the film tabbing strip 5 and the remaining length of such tabbing strip is maintained by a tab tensioning arm 29 (on which the guide roller 25 is rotatably supported) and by a spindle braking band 30. The tensioning arm 29 is fixed to a pivot rod 31 which, in turn, is rotatably supported by the box-like base 13. The braking band 30 extends partially about a spindle hub member 32, with the opposite band ends being attached to an anchor block 33 on the base 13 and to a hook member 34 of a spindle braking arm 35. The braking arm 35 extends substantially parallel to the tensioning arm 29 and is fixed to the pivot rod 31 so as to pivot concurrently with the tensioning arm upon rotation of the pivot rod. A helical tension spring 36 is disposed to urge the braking arm 35 in a counterclockwise direction, as viewed in FIG. 2, to tighten the braking band 30 about the spindle hub 32 and thereby prevent rotation of the spindle 15 and the tabbing strip supply reel 4. The spring 36 similarly urges the tensioning arm 29 to apply a strip tensioning force at a segment of the tabbing strip 5 which extends about the guide roller 25.

Referring again to FIG. 2, tension between the engaged section of the negative film strip 2 and the remaining length of such film strip is maintained by a film tensioning arm 37 (on which the guide roller 17 is rotatably mounted) and by a spindle braking band 38. Since the members of the film tabbing apparatus 12 which cooperate with the film tensioning arm 37 and the braking band 38 to maintain film strip tension are substantially identical in function and structure to those members of the film tabbing apparatus which cooperate with the tab tensioning arm 29 and the braking band 30 to maintain tabbing strip tension, a description of the first-mentioned members (indicated by the reference numbers 31', 32', 33', 34', 35' and 36') is considered unnecessary in view of the previous description of the tab tensioning members 31–36. It will be appreciated, however, that the helical tension spring 36' is disposed to urge the film tensioning arm 37 and the braking arm 35' in a clockwise direction, as viewed in FIG. 2, in contrast to the spring 36 which urges the tab tensioning arm 29 and the braking arm 35 in a counterclockwise direction.

Figure 6:
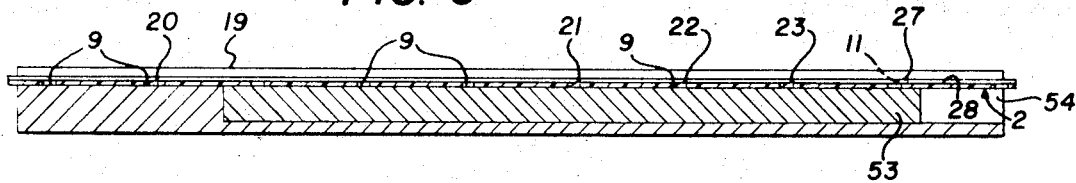
FIG. 6 is a section view of the film and tabbing strip sections and the strip advancing and aligning mechanism, as viewed along the line 6—6 in FIG. 4.

Considering now the manner in which respective sections of the negative film strip 2 and the film tabbing strip 5 are secured together, there is shown in FIG. 1 a water application wick 39 which projects from the box-like base 13 to wet the tab edge portion 8 as the tabbing strip is moved successively over the guide rollers 25 and 26. Thus, if respective sections of the film strip 2 and the tabbing strip 5 are drawn off the reels 1 and 4 and advanced into engagement with the pins 20–23 and 27 at the guide track 19 (as shown in FIGS. 3, 4 and 6), the edge portion 8 of such tabbing strip section will be wetted by the wick 39. As described herein-before, when the film and tabbing strip sections are so engaged, the tab edge portion 8 and the emulsion-bearing surface 28 of the film edge portion 7 will be disposed in interfacing relation along the respectively engaged strip sections. Accordingly, the emulsion-bearing film surface 28 which is interfaced with the wetted tab portion 8 will be moistened by such tab edge portion. Previous to the foregoing, a switch 40 is moved from a normally opened position to a closed position as shown in FIG. 1, so as to complete an appropriate electrical circuit (not shown) for heating a heating iron 41 to an operating temperature. A signal lamp 42, located in the electrical circuit, is adapted to light when the heating iron 41 reaches the operating temperature. The operating temperature of the heating iron 41, as will be described hereinafter, varies in accordance with the kind of photographic film involved. Generally, the operating temperature must be of a sufficient magnitude so that when heat from the heating iron 41 is applied to the film and tabbing strip interface, the combination of moisture from the wetted tab portion 8 and such applied heat will soften the emulsion-bearing film surface 28 and cause the film emulsion to become adhesive.

It will be appreciated that the terms "photographic emulsion" or "film emulsion," in specifically referring to the emulsion-bearing film surface 28, comprises a suspension of sensitive silver salts in a gelatin medium forming a coating on the negative film strip 2. Generally, however, the photographic emulsion must be of the kind which when wetted and/or heated sufficiently will soften and become adhesive.

As shown in FIGS. 2 and 3, a hand lever 43 is fixed at one end to a block 44 which, in turn, is located between, and pivotally coupled to, spaced linkage bars 45 and 46. A bottom plate 47 of the box-like base 13 pivotally supports the linkage bars 45 and 46 (see FIG. 3). The heating iron 41 is fixed, along with a heating iron shield 48, to one end of a resiliently flexible support arm 49. The other end of the heating iron support arm 49 is fixed to the base 13. A cam 50, fixed to the arm 49, is pivotally coupled to the hand lever block 44. Accordingly, upon pressing down on the hand lever 43, as viewed in FIG. 3, the heating iron support arm 49 will be depressed by the cam 50, and the heating iron 41 will be moved into abutment against the wetted tab edge portion 8 in the guide track 19. Since such wetted tab edge portion 8 is interfaced with the emulsion-bearing film surface 28, along the film edge portion 7, moisture and heat are applied to the film emulsion. Such combination of moisture and heat serve to soften the film emulsion, causing the film emulsion to act as an adhesive at the film and tabbing strip interface. Pressure applied to the film and tabbing strip interface, upon being sandwiched between the guide track 19 and the heating iron 41, forces the softened adhesive emulsion into the paper fibers of the tab edge portion 8. Thereafter, heat from the heating iron 41 acts to vaporize moisture at the film and tabbing strip interface so as to dry the film emulsion and effect a film and tabbing strip bond. It will be appreciated that, although the heating iron 41 is additionally used in the film tabbing apparatus 12 to dry the moistened adhesive emulsion, other means such as an air stream directed at the film and tabbing strip interface can be used to effect such drying. Moreover, although the water application wick 39 is shown at a location preceding the guide roller 26 in order to wet the tab edge portion 8 prior to interfacing with the film edge portion 7, the wick can be placed at another location (between the guide roller 26 and the heating iron 41) in order to wet the tab edge portion when interfaced with the film edge portion.

It will also be appreciated that the length and width of the film and tabbing strip bond are substantially defined by the length and width of the heating iron area which is applied to the film and tabbing strip interface. In the present example, as illustrated in FIG. 4, the length of the heating iron 41 has been selected in order to secure together a section of the film strip 2 which is made up of four of the negative frames 3 and a section of the tabbing strip 5 which is made up of four of the information areas 6.

Referring now to FIG. 10, there is shown a steam-heating iron 51 which can be used as an alternative to the heating iron 41. Steam, furnished from a suitable source (not shown), may be passed out of the heating iron 51 through a plurality of heating iron vents 52 and directed onto the film and tabbing strip interface. The directed steam will provide moisture and heat at the film and tabbing strip interface for softening and causing the film emulsion to become adhesive. Of course, in this instance, the water application wick 39 can be discarded.

The degree of moisture and heat used to soften and cause photographic emulsion to become adhesive varies according to the kind of film involved. Generally, photographic emulsion (including a gelatin medium) can be softened, causing such emulsion to become adhesive, by any one of the following procedures: (1) wetting and heating the photographic emulsion; (2) heating the photographic emulsion in situations where the ambient relative humidity provides adequate moisture so that, upon heating, the photographic emulsion will flow or soften rather than immediately dry; and (3) wetting the photographic emulsion. For example, the emulsion-bearing surface of Kodacolor II film, when exposed to 60° F – 80° F and 20% RH-65% RH, can be softened so as to cause the film emulsion to become adhesive upon moistening and heating the emulsion-bearing surface to 250° F ± 25° F. In the film tabbing apparatus 12 described hereinbefore, an appropriate thermostat control (not shown) can be used to restrict the operating temperature of the heating iron 41 to a range of 250°F±25°F. As another example, the emulsion-bearing surface of Kodacolor-X film, when exposed to 70° F and 45% RH, can be softened so as to cause the film emulsion to become adhesive upon heating the emulsion-bearing surface to 160° F ± 20° F. As a further example, the emulsion-bearing surface of either Kodacolor-X or Kodacolor II film can be softened so as to cause the film emulsion to become adhesive upon sufficiently wetting the emulsion-bearing surface. It will be understood, generally that the greater the amount of moisture added to a photographic emulsion, the less the degree of heat required to soften such emulsion.

In FIGS. 1 and 4–6, there is shown a film advance carriage 53 from which the film engaging pins 21–23 project. The carriage 53 is movable back and forth along a channel 54 in the guide track 19. A carriage advance knob 55, fixed to the carriage 53 by an interconnecting pin 56, facilitates such carriage movement to the right as viewed in FIGS. 4 and 5. As further viewed in FIGS. 4 and 5, the carriage 53 is urged to the left by a helical tension spring 57. The range of travel of the carriage 53, along the channel 54, is restricted by a limit slot 58 through which the interconnecting pin 56 extends. Specifically, when the carriage 53 is located in a normal left-most position as shown in FIG. 4, the interconnecting pin 56 abuts against an end 59 of the limit slot 58. When the carriage 53 is located in a right-most position as shown in FIG. 5, the interconnecting pin 56 abuts against an end 60 of the limit slot 58. In the normal left-most position, the carriage 53 is disposed completely within the channel 54 (see FIGS. 4 and 6). Whereas, in the right-most position, the carriage 53 partially extends out of the channel 54 (see FIG. 5).

After respective sections of the negative film strip 2 and the film tabbing strip 5 have been secured together in the manner previously described, such secured strip sections are moved out of the guide track 19 by pushing the film advance carriage 53 from the left-most position shown in FIGS. 4 and 6 to the right-most position shown in FIG. 5. When the carriage 53 with the secured strip sections is first advanced from the left-most position, the film strip 2 and the tabbing strip 5 will be disengaged from the film and tab registration pins 20 and 27 (which are fixed to the guide track 19). However, when the carriage 53 with the secured strip sections reaches the right-most position (see FIG. 5), the film strip 2 and the tabbing strip 5 will again be engaged by the film and tab registration pins 20 and 27. Moreover, further respective sections of the film strip 2 and the tabbing strip 5 (which have the same number of image-bearing frames 3 and information areas 6 as the secured strip sections) will be in the position along the guide track 19 previously occupied by the secured strip sections.

As viewed in FIG. 2, upon advancing the carriage 53 with the secured film and tabbing strip sections from the left-most position to the right-most position, a segment of the film strip 2 which extends about the guide rollers 16–18 will be pulled toward the guide track 19, thereby pivoting the film tensioning arm 37 in a counterclockwise direction generally indicated by an arrow 61. Moreover, a segment of the tabbing strip 5 which extends about the guide rollers 24–26 will simultaneously be pulled toward the guide track 19, thereby pivoting the tab tensioning arm 29 in a clockwise direction generally indicated by an arrow 62. As further shown in FIG. 2, the spindle braking arms 35' and 35 will be pivoted with the film and tab tensioning arms 37 and 29 in such counterclockwise and clockwise directions. Accordingly, the spindle braking bands 38 and 30 will slacken about the spindle hubs 32' and 32 so as to permit the spindles 14 and 15 and the film and tabbing strip supply reels 1 and 4 to freely rotate. At this time, since the springs 36', 36 now serve to pivot the film and tab tensioning arms 37, 29 and the spindle braking arms 35', 35 in directions opposite to those generally indicated by the arrows 61 and 62, the film and tab tensioning arms will draw further lengths of the film strip 2 and the tabbing strip 5 off the respective strip supply reels 1 and 4 and the spindle braking bands 38, 30 will begin to tighten about the spindle hubs 32', 32. Upon pivoting of the film and tab tensioning arms 37, 29 and the spindle braking arms 35', 35 to normal or original positions, the spindles 14, 15 and the reels 1, 4 can no longer freely rotate since the braking bands 38, 30 are again firmly tightened about the spindle hubs 32', 32. It will be realized that, since a section of the film strip 2 made up of four of the negative frames 3 and a section of the tabbing strip 5 made up of four of the information areas 6 have been moved out of the guide track 19 upon advancing the carriage 53 from the left-most position to the right-most position, identical length sections of the film and tabbing strips will have been drawn off the respective strip supply reels 1 and 4 by the film and tab tensioning arms 37 and 29.

Figure 7:
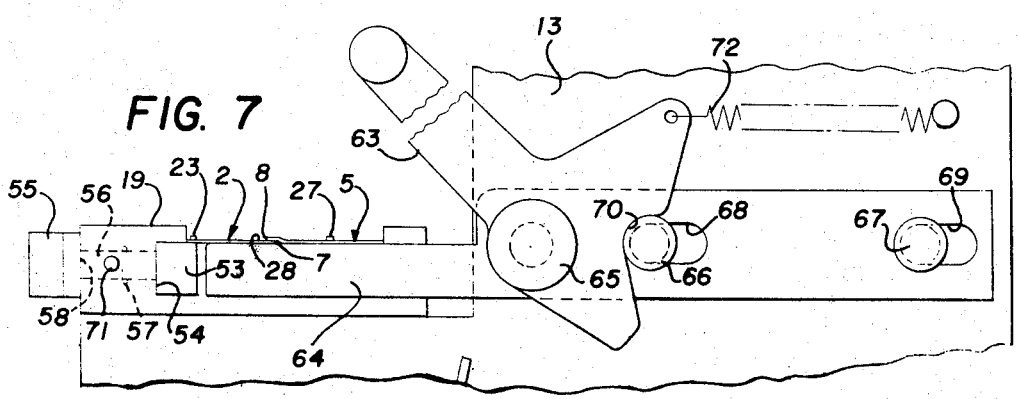
FIGS. 7 and 8 are side elevation views of a scissor assembly for severing secured film and tabbing strip sections from remaining lengths of the film and tabbing strips, respectively showing the scissor assembly in idle and cutting positions.
Figure 8:
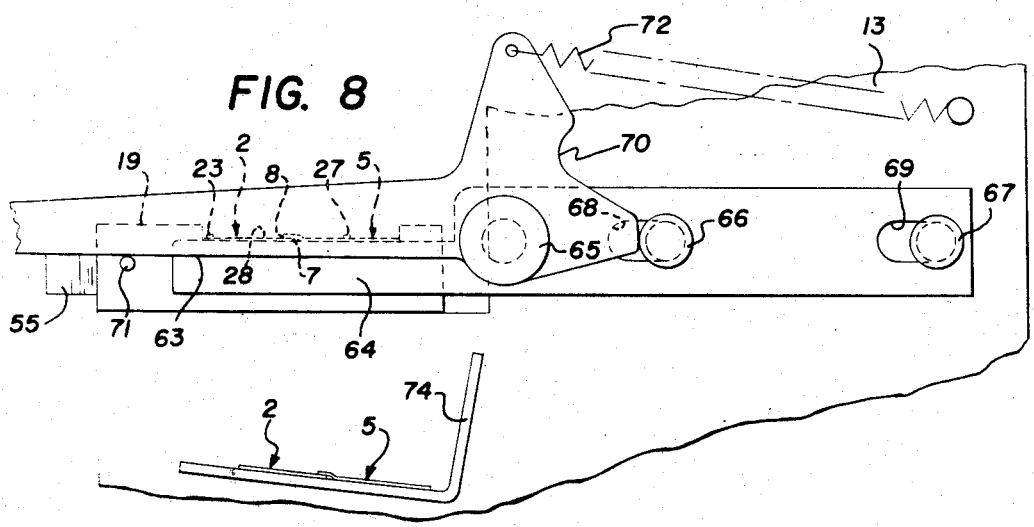

Referring now to FIGS. 7 and 8, there is shown a lever blade 63 which is pivotally connected to a slide blade 64 by a coupling pin 65. A cam pin 66 and a stop pin 67, both of which project from the box-like base 13, extend through slots 68 and 69 in the slide blade 64 so as to support such blade for movement in left and right directions as viewed in FIGS. 7 and 8. Upon pivoting the lever blade 63 in a counterclockwise direction about the coupling pin 66, the lever and slide blades will simultaneously be moved to the left, as viewed in FIGS. 7 and 8, owing to the interaction of the cam pin 66 and a camming edge 70 of the lever blade. A stop pin 71, fixed to the guide track 19, limits such counterclockwise pivotal movement of the lever blade 63 (see FIG. 8). Moreover, the stop pin 67 and the slot 69 cooperate to limit movement of the lever and slide blades to the left. Upon releasing the lever blade 63, a helical tension spring 73, interconnecting the lever blade and the base 13 serves to return the lever and slide blades to a normal or original position as shown in FIG. 7.

Once the secured sections of the negative film strip 2 and the film tabbing strip 5 have been moved out of the guide track 19 so as to draw trailing or immediately succeeding film and tabbing strip sections into respective engagement with the film and tab registration pins 20 and 27 (see FIGS. 2 and 5), the film member of the secured strip sections is disengaged from the carriage pins 21–23 upon releasing the carriage 53 (which is returned to the normal left-most position by the spring 57). Upon return of the carriage 53 to the normal left-most position, the carriage pins 21–23 will move into engagement with the trailing film strip section. Thereafter, the secured film and tabbing strip sections can be severed from the trailing film and tabbing strip sections.

To sever the secured film and tabbing strip sections from the trailing film and tabbing strip sections, at a cutting line 73 which is schematically illustrated in FIG. 5, the lever blade 63 is pivoted in a counterclockwise direction about the coupling pin 54, as shown in FIGS. 7 and 8. Movement of the lever blade 63 alongside the slide blade 64 effects the necessary strip cutting action and the secured film and tabbing strip sections drop into a collection bin 74.

If either one of the trailing film and tabbing strip sections is not engaged in the guide track 19 by an appropriate one of the film and tab registration pins 20 and 27 then, upon severance of the trailing film and tabbing strip sections from the secured film and tabbing strip sections, the non-engaged one of the trailing strip sections will be slightly pulled to the left as viewed in FIGS. 2 and 4 by an appropriate one of the strip tensioning arm 37 and 29. Whereupon, the non-engaged strip section will be moved into engagement with an appropriate one of the strip registration pins 20 and 27. Specifically, as illustrated in FIG. 11, if the tab member of the trailing film and tabbing strip sections is not engaged by the tab registration pin 27 then, upon severing the trailing film and tabbing strip sections from the secured film and tabbing strip sections, such non-engaged tab member will be free to move along the guide track 19. Thus, the non-engaged tab member will be slightly pulled to the left, onto the tab registration pin 27, by the tab tensioning arm 29. Generally, the foregoing situation does not arise. However, such situation may occur in instances where the paper tabbing strip 5 has swelled because of exposure to a relatively high ambient humidity, so that the respective spacing between the perforations 11 has slightly increased.

Figure 12:
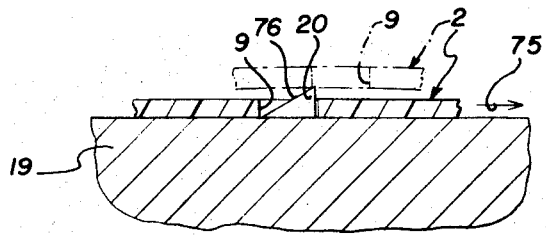
FIGS. 12 and 13 are enlarged views of a portion of FIG. 6, respectively illustrating the manner in which a film strip section is disengaged from a pin member of the strip advancing and aligning mechanism and an immediately succeeding film strip section is engaged by the pin member.
Figure 13:
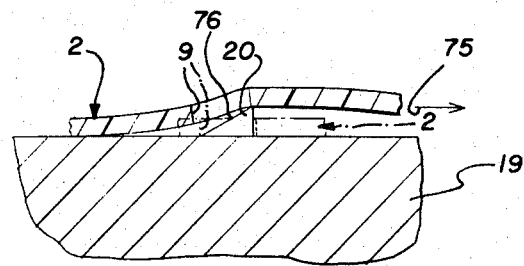
Figure 14:
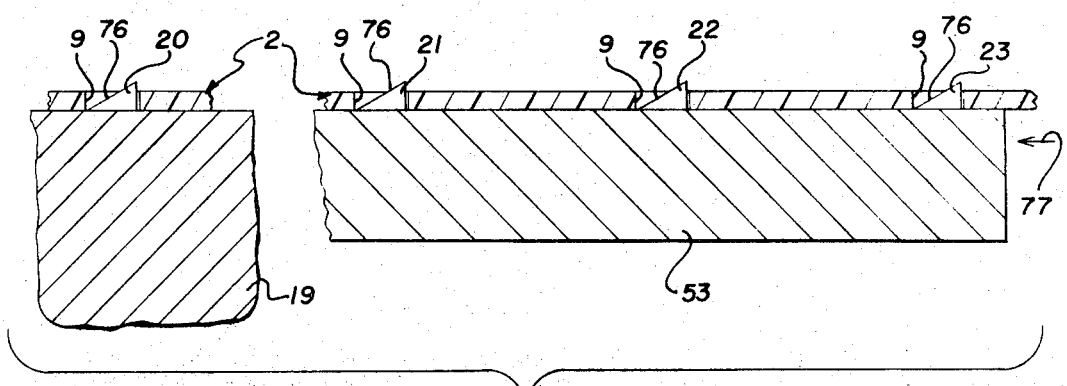
FIG. 14 is an enlarged view of a portion of FIG. 6, illustrating another feature of the strip advancing and aligning mechanism.

As can be realized from FIGS. 4–6, the film registration pin 20, the tab perforation pin 27 and the carriage pins 21–23 have substantially identical shapes and operate in much the same ways to engage and release either the negative film strip 2 or the film tabbing strip 5. Thus, the description which follows relating to the film registration pin 20 similarly applies to the tab registration pin 27 and the carriage pins 21–23. FIG. 12 schematically illustrates the manner in which the film strip 2 is moved out of engagement with the film registration pin 20 (upon moving the carriage 53 from the left-most position shown in FIG. 4 to the right-most position shown in FIG. 5). Specifically, upon moving the film strip 2 along the guide track 19 in a direction generally indicated by an arrow 75, a ramp portion 76 of the pin 20 serves to guide the film strip out of engagement with such pin. Continued movement of the film strip 2 along the guide track 19 in the same direction, results in a further section of the film strip moving into engagement with the pin 20 in the manner schematically shown by FIG. 13. A further point relating only to the carriage pins 21–23 can be realized by viewing FIG. 14, which shows the carriage 53 in the right-most position (most clearly illustrated in FIG. 5). In FIG. 14, if the carriage 53 is moved along the guide track 19 in a direction generally indicated by an arrow 77, when the film strip 2 is held in engagement with the film registration pin 20 by the film tensioning arm 37 (see FIG. 2), the carriage pins 21–23 will be moved out of engagement with the film strip. Here, the ramp portion 76 of the carriage pins 21–23 serves to facilitate disengagement of such pins from the film strip 2 in a manner opposite to that suggested by FIG. 12.

It will be appreciated that, although the film perforations 9 are respectively spaced apart by the different negative frames 3 and the tab perforations 11 are respectively separated by different tabbing strip sections which are each made up of four of the information areas 6, such film and tab perforation spacing may be varied so long as the film and tab perforations are disposed to cooperate with the film and tab registration pins 20 and 27 for positioning the same number of frame and information areas on individual film and tabbing strip sections in respective alignment.

It will be further appreciated that, although the film tabbing apparatus 12 has been described in use with the negative film strip 2, such apparatus can be modified to accommodate other photographic material such as photographic paper having an emulsion coating.

The present invention has been described in detail with particular reference to a preferred embodiment thereof, but it will be understood that variations and modifications can be effected within the spirit and scope of the invention.

We claim:

1. Apparatus for securing together respective sections of a photographic film strip and a film tabbing strip and for severing film and tabbing strip sections so secured from remaining lengths of the film and tabbing strips, wherein the film strip has a longitudinally extending series of frame areas, and wherein the tabbing strip has a longitudinally extending series of information areas which can be respectively aligned with the film frame areas, said apparatus comprising:

means engageable with such film and tabbing strips for positioning the frame and information areas thereon in respective alignment;

means for moving respective sections of such film and tabbing strips which have the same number of frames and information areas selectively into and out of engagement with said positioning means;

means for securing such film and tabbing strip sections together when the frame and information areas thereon are positioned in respective alignment; and means for severing such film and tabbing strip sections, so secured together, from remaining lengths of such film and tabbing strips.

2. Apparatus as recited in claim 1, wherein such film and tabbing strips each further have a longitudinally extending series of generally uniformly spaced perforations, and wherein said positioning means includes:

at least two pin members respectively adapted to be received in such film and tabbing strip perforations for engaging such film and tabbing strips; and means for supporting such film and tabbing strips in substantially parallel relation upon engagement with said pin members.

3. Apparatus for securing together respective sections of a photographic film strip and a film tabbing strip and for severing film and tabbing strip sections so secured from remaining lengths of the film and tabbing strips, wherein the film strip has a longitudinally extending series of frame areas, and wherein the tabbing strip has a longitudinally extending series of information areas which can be respectively aligned with the film frame areas, said apparatus comprising:

means engageable with such film and tabbing strips for positioning the frame and information areas thereon in respective alignment;

means for securing together respective first sections of such film and tabbing strips which have the same number of frame and information areas, when such film and tabbing strip first sections are engaged with said positioning means;

means for moving such film and tabbing strip first sections, so secured together, out of engagement with said positioning means and for thereafter moving respective second sections of such film and tabbing strips which have the same number of frame and information areas as such film and tabbing strip first sections into engagement with said positioning means; and means for severing such film and tabbing strip first sections from such film and tabbing strip second sections.

4. Apparatus for securing together respective sections of a photographic film strip and a film tabbing strip and for severing film and tabbing strip sections so secured from remaining lengths of the film and tabbing strips, wherein the film strip is wound in a roll and has a longitudinally extending series of frame areas, and wherein the tabbing strip is wound in a roll and has a longitudinally extending series of information areas which can be respectively aligned with the film frame areas, said apparatus comprising:

means for drawing respective sections of such film and tabbing strips which have the same number of frame and information areas off such film and tabbing strip rolls;

means defining a guideway for supporting such film and tabbing strip sections in substantially coplanar, parallel relation;

means, disposed in said guideway, for engaging such film and tabbing strip sections to locate the frame and information areas thereon in respective alignment;

means for moving such film and tabbing strip sections, along said guideway, selectively into and out of engagement with said engaging means;

means for securing such film and tabbing strip sections together when the frame and information areas thereon are engaged with said engaging means; and means for severing such film and tabbing strip sections, so secured together, from remaining lengths of such film and tabbing strips.

5. Apparatus for securing together respective sections of a photographic film strip and a film tabbing strip and for severing film and tabbing strip sections so secured from remaining lengths of the film and tabbing strips, wherein the film strip has a longitudinally extending series of frame areas, wherein the tabbing strip has a longitudinally extending series of information areas which can be respectively aligned with the film frame areas, and wherein the film and tabbing strips each further have a longitudinally extending series of generally uniformly spaced perforations, said apparatus comprising:

means, including two pin members respectively adapted to be received in such film and tabbing strip perforations for engaging such film and tabbing strips, for positioning the frame and information areas on such film and tabbing strips in respective alignment;

said pin members respectively including means defining ramp portions for guiding individual sections of such film and tabbing strips successively into and out of engagement with said pin members;

means for moving respective sections of such film and tabbing strips which have the same number of frame and information areas, in a first direction, successively into and out of engagement with said pin members;

means for respectively urging such film and tabbing strip sections, in a second direction which is opposite to said first direction, for holding such film and tabbing strip sections in engagement with said pin members;

means for securing such film and tabbing strip sections together, when engaged with said pin members; and means for severing such film and tabbing strip sections, so secured together, from remaining lengths of such film and tabbing strips.

6. Apparatus for securing together respective sections of a photographic film strip and a film tabbing strip and for severing film and tabbing strip sections so secured from remaining lengths of the film and tabbing strips, wherein the film strip is wound in a roll and has a longitudinally extending series of frame areas, wherein the tabbing strip is wound in a roll and has a longitudinally extending series of information areas which can be respectively aligned with the film frame areas, and wherein the film and tabbing strips each further have a longitudinally extending series of generally uniformly spaced perforations, said apparatus comprising:

means for drawing respective sections of such film and tabbing strips which have the same number of frame and information areas off such film and tabbing strip rolls;

means defining a guideway for supporting such film and tabbing strip sections in substantially coplanar, parallel relation;

two pin members, disposed in said guideway and respectively adapted to be received in such film and tabbing strip perforations, for engaging such film and tabbing strip sections and locating the frame and information areas thereon in respective alignment;

said pin members respectively including means defining ramp portions for guiding individual sections of such film and tabbing strip sections successively into and out of engagement with said pin members, upon movement of such film and tabbing strip sections in a first direction along said guideway;

means for moving such film and tabbing strip sections, in said first direction along said guideway, successively into and out of engagement with said pin members;

film and tabbing strip tensioning means, disposed between such film and tabbing strip rolls and said guideway, for respectively urging such film and tabbing strip sections, in a second direction which is opposite to said first direction, for holding such film and tabbing strip sections in engagement with said pin members;

means for securing such film and tabbing strip sections together, when engaged with said pin members; and means for severing such film and tabbing strip sections, so secured together, from remaining lengths of such film and tabbing strips.

* * * * *